May 13, 1958     D. H. CHADWICK     2,834,797
METHOD OF PRODUCING MONO- AND DIALKYL HYDROGEN PHOSPHITES
Filed Feb. 25, 1953
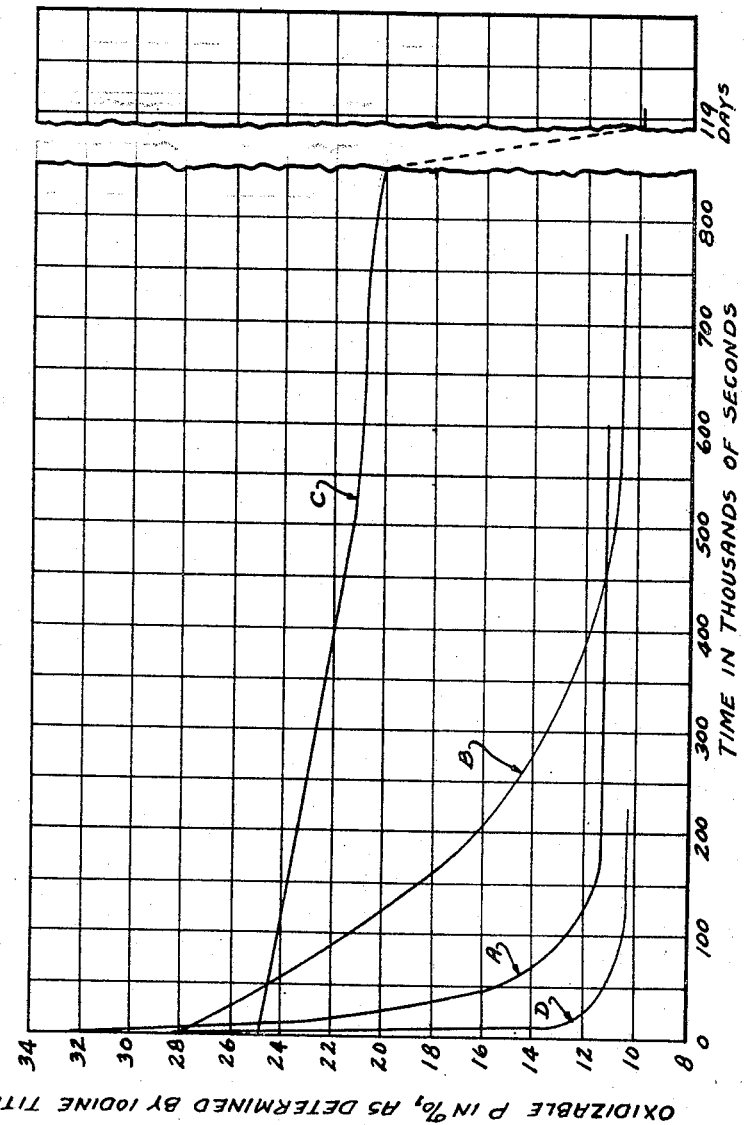
A. DIMETHYL PHOSPHITE – PHOSPHOROUS ACID REACTION AT 25°C.
B. DIETHYL PHOSPHITE – PHOSPHOROUS ACID REACTION AT 25°C.
C. DIISOPROPYL PHOSPHITE – PHOSPHOROUS ACID REACTION AT 25°C.
D. DIETHYL PHOSPHITE – PHOSPHOROUS ACID REACTION AT 60°C.
INVENTOR.
DAVID H. CHADWICK
BY Elmer P. Rucker
ATTORNEY

United States Patent Office 2,834,797
Patented May 13, 1958

2,834,797
METHOD OF PRODUCING MONO- AND DIALKYL HYDROGEN PHOSPHITES

David H. Chadwick, Anniston, Ala., assignor to Monsanto Chemical Company, St. Louis, Mo., a corporation of Delaware Application February 25, 1953, Serial No. 338,738

7 Claims. (Cl. 260—461)

The present invention relates to compositions of matter comprising essentially mono- and dialkyl hydrogen phosphites containing up to 6 carbon atoms in the alkyl group and to a novel method of producing same.

An object of the invention is to provide an economically and commercially practical method of producing the above compounds.

Another object of the invention is to provide a method of producing mono- and dialkyl hydrogen phosphites which does not require specially skilled operators or the use of expensive or complicated apparatus.

Another object of the invention is to provide a method of producing mono- and dialkyl hydrogen phosphites which is relatively simple and inexpensive to operate as compared with prior methods of producing these compounds.

A further object of the invention is to provide a method of producing mono- and dialkyl hydrogen phosphites which eliminates the difficulties and disadvantages which accompany the formation of corrosive by-product gases by the method involving the reaction of phosphorus trihalides and alcohols.

A still further object of the invention is to provide a method of producing mono- and dialkyl hydrogen phosphites which involves the use of readily available raw materials.

Other objects and advantages will be apparent to those skilled in the art as the description of the present invention proceeds.

To the accomplishment of the foregoing and related ends, the invention, then, consists of the method hereinafter fully described and particularly pointed out in the claims, the following description setting forth various ways in which the principle of the invention may be used.

In the practice of this invention, mono- and dialkyl hydrogen phosphites are produced by reacting phosphorous acid with a compound selected from the group consisting of dialkyl and trialkyl phosphites which contain up to 6 carbon atoms in the alkyl groups, the reactants being desirably employed in a molar ratio of said phosphites to phosphorous acid of about 1:1, 2:1 and 1:2, respectively. These reactions which lead to the production of mono- and dialkyl hydrogen phosphites may be represented by the following equations:

(1) $(RO)_2POH + P(OH)_3 \rightleftharpoons 2ROP(OH)_2$ (2) $(RO)_3P + P(OH)_3 \rightarrow (RO)_2POH + ROP(OH)_2 \rightarrow$
    $\{(RO)_2POH + P(OH)_3 \rightleftharpoons ROP(OH)_2$ (3) $(RO)_3P + 2P(OH)_3 \rightarrow$
    $\{(RO)_2POH + P(OH)_3 \rightleftharpoons ROP(OH)_2$ (4) $2(RO)_3P + P(OH)_3 \rightarrow 3(RO)_2POH$ wherein R is the same or different alkyl groups containing 1 to 6 carbon atoms.

The reaction represented by the first equation results in the establishment of an equilibrium system in which the dialkyl phosphite and phosphorous acid are in equilibrium with the monoalkyl phosphite. In this equilibrium mixture, the ratio of monoalkyl phosphite to phosphorous acid to dialkyl phosphite is about 3.4:1:1.

In the reaction shown in Equation 2, an equilibrium system is established in which dialkyl phosphites and phosphorous acid are also in equilibrium with the monoalkyl phosphite. In this system, the monoalkyl phosphite constitutes the principal component of the mixture, but the dialkyl phosphite is in a higher concentration than in the equilibrium mixture obtained by reaction represented by Equation 1.

In Equation 3, the reaction results in an equilibrium system similar to reaction 1.

For a more complete understanding of the instant invention, reference is made to the accompanying drawing and also the following illustrative examples.

The accompanying drawing graphically illustrates the equilibrium system that is established upon reacting 1 mol of diethyl phosphite with 1 mol of phosphorous acid at room temperature; the differences in the rates of ester interchange between phosphorous acid and di-methyl-, diethyl- and diisopropyl phosphites, respectively; and the increased rate of reaction obtained by raising the temperature from 25° C. to 60° C. in the reaction between phosphorous acid and diethyl phosphite.

The invention is further illustrated, but not limited, by the following examples.

*Example I*

Dimethyl-, diethyl- and diisopropyl phosphite were each mixed with molten phosphorous acid in a molar ratio of phosphite to phosphorous acid of substantially 1:1 and the resulting products quickly cooled to room temperature. The cooled mixtures were then allowed to react until equilibrium conditions had been established.

The rate and extent of transfer of the alkyl groups from the dialkyl phosphite to the phosphorous acid with the formation of the corresponding monoalkyl phosphite was followed by periodically removing samples from the reaction mixture and titrating these samples with iodine in a sodium bicarbonate buffered solution. Under these conditions, both the dialkyl phosphite and phosphorous acid react with iodine, whereas the monoalkyl phosphite does not. [Nylén Z. Anorg. Allgem. Chem., 230, 385–404 (1937).]

The course of the above reactions is graphically illustrated in curves A, B and C of the accompanying drawing, which show that as the interchange proceeds, the oxidizable phosphorus as determined by iodine titration decreases with time, reaching a constant value at equilibrium. Moreover, these curves show that with equimolecular mixtures of phosphorous acid with di-methyl, diethyl and diisopropyl phosphites, the interchange proceeds less rapidly as the size of the alkyl group increases. Thus, in the case of dimethyl phosphite, equilibrium was established in less than two days; with diethyl phosphite, in about 7 days; and with diisopropyl phosphite, in a period of weeks.

*Example II*

The procedure described in the preceding example was repeated using diethyl phosphite, molten phosphorous acid and a reaction temperature of about 60° C.

The results obtained by this reaction are graphically illustrated in curve D of the accompanying drawing. From a comparison of this curve with curve B of the drawing, it is evident that an increase in temperature from 25° C. to 60° C. has a significant effect on the rate of establishment of equilibrium but not on the position of equilibrium.

*Example III*

Triethyl phosphite and phosphorous acid were mixed together and reacted at about 25° C. in a molar ratio of phosphite to phosphorous acid of about 2:1, the reaction resulting in the formation of a homogeneous solution which was water white in color. This solution was subjected to distillation under reduced pressure and a product was recovered, which boiled within the range of about 86° C. to about 91° C. while under a reduced pressure of from about 26 mm. to about 30 mm. of mercury. This product had a density at 25° C. of 1.404 as compared with 1.408 at 20° C. for pure diethyl phosphite, and this fact, together with the boiling point of the distillate and the non-volatility of the phosphorous acid, indicated that all of it was diethyl phosphite. This was further confirmed by titrating the distillate with iodine, which showed a content of oxidizable phosphorous of 22.4% as compared to 22.2% for diethyl phosphite. The distillate, namely, diethyl phosphite, was obtained in a yield corresponding to 78% of theory, basis triethyl phosphite.

In the production of mono- and dialkyl phosphites in accordance with this invention, the reactants may be employed in a wide range of molar ratios, for example, in the molar ratio range of from 100:1 to 1:100, depending upon the ultimate use of the product. More specifically, the reactants may be employed in a phosphite to phosphorous acid molar ratio of from about 1:2 to about 3:1, depending upon the reactants and the reaction product desired. For example, if a dialkyl phosphite and phosphorous acid are the initial reactants, they are employed in a molar ratio of phosphite to phosphorous acid within the range of about 2:1 to about 1:2, and preferably in a molar ratio of phosphite to phosphorous acid of about 1:1. If the initial reactants are trialkyl phosphite and phosphorous acid, they are employed in a molar ratio of phosphite to phosphorous acid of about 1:2 to about 3:1 and within this range a molar ratio of about 2:1 is preferable in order to obtain a maximum yield of the dialkyl phosphite. However, if the same reactants are employed and a maximum yield of monoalkyl phosphite is desired, then the reactants are employed in a molar ratio of phosphite to phosphorous acid of about 1:2. It is also within the scope of the invention to use larger or smaller molar ratios of phosphite to phosphorous acid if it is so desired.

The reaction leading to the formation of mono- and dialkyl phosphites may be carried out at a temperature ranging from about 25° C. up to that temperature at which substantial decomposition of the reaction product is avoided. More specifically, the reaction is executed at a temperature substantially in the range of about 50° C. to about 150° C. and within this range a temperature of about 90° C. to about 100° C. is preferred.

The specific examples have been directed to the production of monoalkyl and dialkyl hydrogen phosphites containing up to 3 carbon atoms in the alkyl groups, but the invention is not restricted thereto as it is also applicable to the production of alkyl hydrogen phosphites containing up to and including 6 carbon atoms in the alkyl groups.

The rates of reaction between the dialkyl and trialkyl phosphites and phosphorous acid decrease at room temperature as the number of carbon atoms increases, but these rates are brought into a practical range by suitably raising the reaction temperature.

The present invention is eminently suitable for use in reclaiming the still bottoms produced as a by-product of dialkyl phosphite manufacture. Such still bottoms contain relatively large amounts of phosphorous acid and monoalkyl phosphites and at the present time they are discarded as waste since there is no satisfactory method of reclaiming these products. This wasteful practice can now be eliminated by the instant invention since trialkyl phosphites may be added and reacted with the still bottoms to produce dialkyl phosphites and thus substantially increase the overall yield of this desirable product.

The products obtained by the method of the instant invention serve as a reservoir of material for slowly generating dialkyl phosphites, which will oxidize. Therefore, they are eminently useful as stabilizers for plastics such as polymerized vinyl resins.

What I claim is:

1. The method of preparing an alkyl hydrogen phosphite wherein the alkyl substituent contains from 1 to 6 carbon atoms, which consists in reacting an ester selected from the group consisting of dialkyl phosphites and trialkyl phosphites, wherein the respective phosphites the alkyl substituents contain from 1 to 6 carbon atoms, and phosphorous acid in a molar ratio of said ester to said phosphorous acid of about 100:1 to about 1:100 at a temperature within the range of about 25° C. up to the temperature at which substantial decomposition of the reaction products is avoided.

2. The method of preparing a monoalkyl phosphite wherein the alkyl substituent contains from 1 to 6 carbon atoms which consists in reacting a dialkyl phosphite, wherein each alkyl substituent contains from 1 to 6 carbon atoms, with phosphorous acid in a molar ratio of said dialkyl phosphite to said phosphorous acid of about 2:1 to about 1:2 at a temperature within the range of about 25° C. up to the temperature at which substantial decomposition of the reaction products is avoided.

3. The method of preparing a monoalkyl phosphite wherein the alkyl substituent contains from 1 to 6 carbon atoms which consists in reacting a trialkyl phosphite, whose alkyl substituents contain from 1 to 6 carbon atoms, and phosphorous acid in a molar ratio of said ester to said phosphorous acid of about 1:2 to about 1:1 at a temperature within the range of about 25° C. up to the temperature at which substantial decomposition of the reaction products is avoided.

4. The method of preparing monomethyl phosphite which consists in reacting dimethyl phosphite and phosphorous acid in a molar ratio of about 1:1 at a temperature of about 25° C.

5. The method of preparing monoethyl phosphite which consists in reacting diethyl phosphite and phosphorous acid in a molar ratio of about 1:1 at a temperature of about 25° C.

6. The method of preparing monoisopropyl phosphite which consists in reacting diisopropyl phosphite and phosphorous acid in a molar ratio of about 1:1 at a temperature of about 25° C.

7. The method of preparing diethyl phosphite which consists in reacting triethyl phosphite and phosphorous acid in a molar ratio of about 2:1 at a temperature of about 25° C.

References Cited in the file of this patent

Nylén: Svenck Kenisck Tidakrift, vol. 48 (1936), pp. 2–22.

Kosolopoff: Organo-Phosphorus Compounds, page 189 (1950).